US009517584B2

(12) United States Patent
McCrary

(10) Patent No.: US 9,517,584 B2
(45) Date of Patent: Dec. 13, 2016

(54) ARTICLES COMPRISING ISOSORBIDE AND PROCESSES FOR THEIR MANUFACTURE

(71) Applicant: Eastman Chemical Company, Kingsport, TN (US)

(72) Inventor: Robert Ellis McCrary, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 189 days.

(21) Appl. No.: 14/132,361

(22) Filed: Dec. 18, 2013

(65) Prior Publication Data

US 2015/0165668 A1   Jun. 18, 2015

(51) Int. Cl.
| | |
|---|---|
| *B29C 49/00* | (2006.01) |
| *B29C 49/64* | (2006.01) |
| *C08G 63/199* | (2006.01) |
| *C08G 63/672* | (2006.01) |
| *B29L 31/00* | (2006.01) |
| *B29K 25/00* | (2006.01) |
| *B29K 33/00* | (2006.01) |
| *B29K 67/00* | (2006.01) |
| *B29K 69/00* | (2006.01) |

(52) U.S. Cl.
CPC ....... *B29C 49/0005* (2013.01); *B29C 49/6418* (2013.01); *C08G 63/199* (2013.01); *C08G 63/672* (2013.01); *B29K 2025/06* (2013.01); *B29K 2033/08* (2013.01); *B29K 2033/12* (2013.01); *B29K 2067/00* (2013.01); *B29K 2069/00* (2013.01); *B29L 2031/7158* (2013.01)

(58) Field of Classification Search
None
See application file for complete search history.

(56) References Cited

U.S. PATENT DOCUMENTS

| | | | |
|---|---|---|---|
| 2,465,319 A | 3/1949 | Whinfield et al. | |
| 2,901,466 A | 8/1959 | Kibler et al. | |
| 3,032,822 A | 5/1962 | Maddock | |
| 3,033,826 A | 5/1962 | Kibler et al. | |
| 3,047,539 A | 7/1962 | Pengilly | |
| 3,223,752 A | 12/1965 | Tate et al. | |
| 4,025,492 A | 5/1977 | Binsack et al. | |
| 4,136,089 A | 1/1979 | Bier et al. | |
| 4,176,224 A | 11/1979 | Bier et al. | |
| 4,196,186 A | 4/1980 | Bogoch | |
| 4,208,527 A | 6/1980 | Horlbeck et al. | |
| 4,238,593 A | 12/1980 | Duh | |
| 4,521,556 A | 6/1985 | Adams | |
| 4,554,343 A | 11/1985 | Jackson, Jr. et al. | |
| 4,578,453 A | 3/1986 | Jackson, Jr. et al. | |
| 4,740,581 A | 4/1988 | Pruett et al. | |
| 4,749,772 A | 6/1988 | Weaver et al. | |
| 4,749,773 A | 6/1988 | Weaver et al. | |
| 4,749,774 A | 6/1988 | Weaver et al. | |
| 4,950,732 A | 8/1990 | Weaver et al. | |
| 4,959,450 A | 9/1990 | Morris et al. | |
| 5,106,941 A | 4/1992 | Jenkins et al. | |
| 5,106,944 A | 4/1992 | Sublett | |
| 5,194,573 A | 3/1993 | Schmidt et al. | |
| 5,198,530 A | 3/1993 | Kyber et al. | |
| 5,296,586 A | 3/1994 | Burch et al. | |
| 5,340,910 A | 8/1994 | Chamberlin et al. | |
| 5,372,864 A | 12/1994 | Weaver et al. | |
| 5,376,735 A | 12/1994 | Sublett | |
| 5,384,377 A | 1/1995 | Weaver et al. | |
| 5,464,590 A | 11/1995 | Yount et al. | |
| 5,608,031 A | 3/1997 | Yau et al. | |
| 5,654,347 A | 8/1997 | Khemani et al. | |
| 5,681,918 A | 10/1997 | Adams et al. | |
| 5,696,176 A | 12/1997 | Khemani et al. | |
| 5,958,581 A | 9/1999 | Khanarian et al. | |
| 5,959,066 A | 9/1999 | Charbonneau et al. | |
| 6,025,061 A | 2/2000 | Khanarian et al. | |
| 6,063,464 A | 5/2000 | Charbonneau et al. | |
| 6,126,992 A | 10/2000 | Khanarian et al. | |
| 6,140,122 A | 10/2000 | Romet-Lemonne et al. | |
| 6,407,266 B2 | 6/2002 | Bhatia | |
| 6,429,278 B1 | 8/2002 | Howell, Jr. et al. | |
| 8,501,287 B2 * | 8/2013 | Pecorini | B29C 49/0005 215/11.1 |
| 2004/0236066 A1 * | 11/2004 | Moore | C08G 63/80 528/308.1 |

FOREIGN PATENT DOCUMENTS

| | | |
|---|---|---|
| EP | 0 434 925 A2 | 7/1991 |
| EP | 0 826 713 | 3/1998 |
| WO | WO 98/45350 | 10/1998 |
| WO | 99/54534 A1 | 10/1999 |
| WO | WO 99/54119 | 10/1999 |
| WO | WO 99/54375 | 10/1999 |
| WO | WO 99/54378 | 10/1999 |
| WO | WO 99/54399 | 10/1999 |
| WO | WO 99/54529 | 10/1999 |
| WO | WO 99/54533 | 10/1999 |

OTHER PUBLICATIONS

Wilfong, R. E.; "Linear Polyesters"; Journal of Polymer Science, vol. 54, pp. 385-410, (1961).

* cited by examiner

*Primary Examiner* — Monica Huson
(74) *Attorney, Agent, or Firm* — Robert C. Morriss

(57) ABSTRACT

The invention is generally directed to sports bottles and other articles produced by blow molding from polymeric materials containing isosorbide having glass transition temperatures ranging from 90° C. to 130° C., as well as to processes for producing them. These articles can be exposed to water at high temperatures and can be produced by using a suitable combination of a stretch ratio of less than 3× and a preform temperature at least 20° C. greater than the glass transition temperature (Tg) of the polymeric material.

25 Claims, No Drawings

ARTICLES COMPRISING ISOSORBIDE AND PROCESSES FOR THEIR MANUFACTURE

FIELD OF THE INVENTION

The invention is generally directed to sports bottles and other articles produced by blow molding from polymeric materials having glass transition temperatures ranging from 90° C. to 130° C. as well as to processes for producing them.

BACKGROUND OF THE INVENTION

Plastic is a popular material used to make bottles that are both transparent and shatter resistant. Typically, sports bottles and baby bottles are placed in the dishwasher at some point and are subjected to high temperatures and to chemical exposure. Thus, plastics with higher Tg values, such as bisphenol-A polycarbonate, amorphous polyamide and polysulfone, are commonly used to fabricate sports bottles or baby bottles.

Many plastic bottles are produced by blow molding, which restricts the materials to high Tg plastic materials. Blow molding typically involves the injection molding of a preform in an injection mold, followed by pressurized-air inflation of this preform at a warm temperature in a blow mold. The bottle is then quenched below the Tg of the material by contact with the blow mold. This quenching after inflation, however, traps molecular orientation into the sidewalls of the bottle that can be released during boiling-water sterilization, causing the bottle to distort or shrink. In order to prevent shrinkage during boiling water sterilization, the Tg of plastics currently employed in the prior art to produce blow molded sports bottles is at least 30° C. above boiling water, that is, at least 130° C.

These high Tg materials also have certain deficiencies, such as cost, unfavorable consumer perception because of the presence of bisphenol A, insufficient chemical resistance, insufficient hydrolytic stability, etc, which can limit their use in these applications. Thus, there is a need in the industry for sports bottles produced from alternative plastic materials.

SUMMARY OF THE INVENTION

This invention is believed to meet the above described need in the art.

The present disclosure is generally directed to bottles and other articles comprising isosorbide produced by blow molding from polymeric materials having glass transition temperatures ranging from 90° C. to 130° C., as well as to processes for producing them. These articles can be produced by a suitable combination of stretch ratio and process conditions during blow molding and are capable of being exposed to boiling water without exhibiting detrimental shrinking or distortion.

In one embodiment, bottles are produced with a stretch ratio of less than or equal to 3×. In another embodiments, the stretch ratio is less than or equal to 2.5× or less than or equal to 2.0×. In yet another embodiment, the stretch ratio is in the range from 1.2× to 2.0×. In one embodiment, the preform temperature at the time of inflation is Tg+20° C. or higher. In another embodiment, the preform temperature at the time of inflation is Tg+30° C. or higher. In another embodiment, the stretch ratio is less than 2× and the preform temperature is Tg+30° C. or higher. In another embodiment, the stretch ratio is less than 1.6× and the perform temperature is Tg+20° C. or higher. By comparison, typical prior art plastic soft-drink containers have stretch ratios of greater than 3 and their performs are typically at a temperature of Tg+20° C. at the time of blowing.

In one aspect of the invention, there is provided a process for making a bottle comprising blow molding a preform made from a polymeric material;
wherein the preform temperature at the time of inflation is at least 20° C. above the Tg temperature of the polymeric material;
wherein the stretch ratio of the bottle with respect to the preform is 2.7× or less;
wherein the Tg of the polymeric material is from 90° C. to 130° C.; and
wherein the bottle displays shrinkage of 5% or less after immersion in boiling water for one hour.

In one aspect of the processes of the invention, the glycol component of the polyester composition can comprise: 10 to 35 mole % of isosorbide residues; 40 to 65 mole % of 1,4-cyclohexanedimethanol residues, and 20 to 45 mole % ethylene glycol residues; or 10 to 30 mole % of isosorbide residues, 45 to 60 mole % of 1,4-cyclohexanedimethanol residues, and 20 to 40 mole % ethylene glycol residues; or 10 to 25 mole % of isosorbide residues, 45 to 55 mole % of 1,4-cyclohexanedimethanol residues, and 20 to 40 mole % ethylene glycol residues; or 20 to 30 mole % of isosorbide residues, 45 to 60 mole % of 1,4-cyclohexanedimethanol residues, and 20 to 40 mole % ethylene glycol residues; wherein the total mole % of the glycol component is 100 mole %.

In one aspect of the invention, there is provided a process for making a sports bottle comprising blow molding a preform made from a polymeric material,
wherein the preform temperature at the time of inflation is at least 20° C. above the Tg temperature of the polymeric material;
wherein the stretch ratio of the sports bottle with respect to the preform is 2.7× or less;
wherein the Tg of the polymeric material is from 90° C. to 130° C.;
wherein the sports bottle displays shrinkage of 5% or less after immersion in boiling water for one hour; and
wherein the polymeric material comprises at least one polyester, which comprises
  (a) a dicarboxylic acid component comprising:
    i) 70 to 100 mole % of terephthalic acid residues;
    ii) 0 to 30 mole % of aromatic dicarboxylic acid residues having up to 20 carbon atoms; and
    iii) 0 to 10 mole % of aliphatic dicarboxylic acid residues having up to 16 carbon atoms; and
  (b) a glycol component comprising:
    i) 5 to 35 mole % of isosorbide residues;
    ii) 40 to 65 mole % of 1,4-cyclohexanedimethanol residues,
    iii) 20 to 40 mole % of ethylene glycol residues;
  wherein the total mole % of the dicarboxylic acid component is 100 mole %, and the total mole % of the glycol component is 100 mole %;
  wherein the inherent viscosity of the polyester is from 0.45 to 1.0 dL/g as determined in 60/40 (wt/wt) phenol/tetrachloroethane at a concentration of 0.5 g/100 ml at 25° C.

In one aspect of the processes of the invention, the polyester can have a Tg of from 95 to 130° C.; or from 95 to 125° C.; or from 95 to 120° C.; or from 100 to 130° C. or from 100 to 125° C.; or from 100 to 120° C.; or from 110 to 130° C.; or from 110 to 125° C.; or from 110 to 120° C.; or from 105 to 125° C.; or from 115 to 125° C.

In one aspect of the processes of the invention, the preform temperature at the time of inflation can be at least 30° C. above the Tg temperature of the polymeric material and/or polyester.

In one aspect of the processes of the invention, the preform temperature at the time of inflation can be from 30° C. above the Tg temperature of the polymeric material and/or polyester to 70° C. above the Tg temperature of the polymeric material and/or polyester.

In one aspect of the processes of the invention, the stretch ratio of the sports bottle with respect to the preform is from 1.2× to 2.7× or from 1.2× to 2.5× or from 1.2× to 2.0× or from 1.3× to 1.7×.

In one aspect of the processes of the invention, the sports bottle can have shrinkage of 5% or less after immersion in boiling water for one hour; or can have a shrinkage of 4% or less after immersion in boiling water for one hour; or can have a shrinkage of 3% or less after immersion in boiling water for one hour; or can have a shrinkage of 2% or less after immersion in boiling water for one hour; or can have a shrinkage of 1% or less after immersion in boiling water for one hour.

In one aspect of the processes of the invention, the side wall of the sports bottle can have: a haze of 3% or less after immersion in boiling water for one hour; or a haze of 2% or less after immersion in boiling water for one hour; or can have a haze of 1% or less after immersion in boiling water for one hour; or a haze of 1% or less after immersion in boiling water for one hour.

In one aspect of the processes of the invention, at least one side wall of the sports bottle can have: a birefringence of 0.02 or less; or a birefringence of 0.015 or less; or a birefringence of 0.01 or less.

In one aspect of the processes of the invention, the stretch ratio of the sports bottle with respect to the preform is from 1.2× to 2.5×;
wherein the Tg of the polyester composition is from 95° C. to 125° C.;
wherein the sports bottle displays shrinkage of 5% or less after immersion in boiling water for one hour; and the inherent viscosity of the polyester is from 0.50 to 0.80 dL/g as determined in 60/40 (wt/wt) phenol/tetrachloroethane at a concentration of 0.5 g/100 ml at 25° C.

In one aspect of the processes of the invention, the preform temperature at the time of inflation of the sports bottle is at least 30° C. above the Tg temperature of the polyester composition.

In one aspect of the processes of the invention, the preform temperature at the time of inflation of the sports bottle is at least 30° C. above the Tg temperature of the polyester composition;
wherein the stretch ratio of the sports bottle with respect to the preform is from 1.4× to 2.0×;
wherein the Tg of the polyester composition is from 95° C. to 130° C.; and
wherein the sports bottle displays shrinkage of 5% or less after immersion in boiling water for one hour;

In one aspect of the processes of the invention, the preform temperature at the time of inflation of the sports bottle is at least 30° C. above the Tg temperature of the polyester composition;
wherein the stretch ratio of the sports bottle with respect to the preform is from 2.7× or less;
wherein the Tg of the polyester composition is from 90° C. to 130° C.;
wherein the sports bottle displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 30 mole % of isosorbide residues;
  ii) 45 to 60 mole % of 1,4-cyclohexanedimethanol residues; and;
  iii) 20 to 40 mole % ethylene glycol residues
wherein the total mole % of the dicarboxylic acid component is 100 mole %, and the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.5 g/100 ml at 25° C.

In one aspect of the invention, the inherent viscosity of the polyester useful in the invention can be from 0.50 to 0.75 dL/g; or 0.50 to 0.70 dL/g; or 0.58 to 0.74 dL/g or 0.55 to 0.80 dL/g or 0.55 to 0.75 dL/g as determined in 60/40 (wt/wt) phenol/tetrachloroethane at a concentration of 0.5 g/100 ml at 25° C.

In one aspect of the processes of the invention, the glycol component of the polyester useful in the invention can comprise 10 to 30 mole % of isosorbide; 45 to 60 mole % of 1,4-cyclohexanedimethanol residues; 20 to 40 mole % ethylene glycol residues;
wherein the inherent viscosity of the polyester can be from 0.55 to 0.80 dL/g as determined in 60/40 (wt/wt) phenol/tetrachloroethane at a concentration of 0.5 g/100 ml at 25° C.; and
the polyester can have a Tg of from 955 to 125° C.

In one aspect of the processes of the invention, the glycol component of the polyester useful in the invention can comprise 10 to 25 mole % of isosorbide residues; 45 to 55 mole % of 1,4-cyclohexanedimethanol residues; and 20 to 40 mole % ethylene glycol residues;
the inherent viscosity of the polyester can be from 0.58 to 0.74 dL/g as determined in 60/40 (wt/wt) phenol/tetrachloroethane at a concentration of 0.5 g/100 ml at 25° C.; and
the polyester can have a Tg of from 95 to 125° C.

In one aspect of the processes of the invention, the process for making a sports bottle can comprise blow molding a preform made from a polyester composition,
wherein the preform temperature at the time of inflation is at least 20° C. above the Tg temperature of the polyester composition;
wherein the stretch ratio of the sports bottle with respect to the preform is from 2.7× or less;
wherein the Tg of the polyester composition is from 90° C. to 130° C.; and
wherein the sports bottle displays shrinkage of 5% or less after immersion in boiling water for one hour.

In one aspect of the processes of the invention, the process for making a sports bottle can comprise blow molding a preform made from a polyester composition,
wherein the preform temperature at the time of inflation is at least 20° C. above the Tg temperature of the polyester composition;
wherein the stretch ratio of the sports bottle with respect to the preform is from 2.7× or less;
wherein the Tg of the polyester composition is from 90° C. to 130° C.;

wherein the sports bottle displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 25 mole % of isosorbide residues;
  ii) 45 to 55 mole % of 1,4-cyclohexanedimethanol residues; and
  iii) 20 to 40 mole % ethylene glycol residues;
wherein the total mole % of the dicarboxylic acid component is 100 mole %, and the total mole % of the glycol component is 100 mole %;
wherein the inherent viscosity of the polyester is from 0.50 to 0.75 dL/g as determined in 60/40 (wt/wt) phenol/tetrachloroethane at a concentration of 0.5 g/100 ml at 25° C.

In one aspect of the processes of the invention, the process for making a sports bottle can comprise blow molding a preform made from a polyester composition,
wherein the preform temperature at the time of inflation is at least 20° C. above the Tg temperature of the polyester composition;
wherein the stretch ratio of the sports bottle with respect to the preform is from 1.2× to 2.5×;
wherein the Tg of the polyester composition is from 90° C. to 130° C.;
wherein the sports bottle displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 5 to 35 mole % of isosorbide residues;
  ii) 40 to 65 mole % of 1,4-cyclohexanedimethanol residues, and
  iii) 20 to 40 mole % ethylene glycol residues;
wherein the total mole % of the dicarboxylic acid component is 100 mole %, and the total mole % of the glycol component is 100 mole %;
wherein the inherent viscosity of the polyester is from 0.40 to 1.0 dL/g as determined in 60/40 (wt/wt) phenol/tetrachloroethane at a concentration of 0.5 g/100 ml at 25° C.

In one aspect of the processes of the invention, the process for making a sports bottle can comprise blow molding a preform made from a polyester composition,
wherein the preform temperature at the time of inflation is at least 30° C. above the Tg temperature of the polyester composition;
wherein the stretch ratio of the sports bottle with respect to the preform is from 1.2× to 2.5×;
wherein the Tg of the polyester composition is from 90° C. to 130° C.;
wherein the sports bottle displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 30 mole % of isosorbide residues;
  ii) 45 to 60 mole % of 1,4-cyclohexanedimethanol residues; and
  iii) 20 to 40 ethylene glycol residues;
wherein the total mole % of the dicarboxylic acid component is 100 mole %, and the total mole % of the glycol component is 100 mole %;
wherein the inherent viscosity of the polyester is from 0.55 to 0.80 dL/g as determined in 60/40 (wt/wt) phenol/tetrachloroethane at a concentration of 0.5 g/100 ml at 25° C.

In one aspect of the processes of the invention, the process for making a sports bottle can comprise blow molding a preform made from a polyester composition,
wherein the preform temperature at the time of inflation is from 30° C. above the Tg temperature of the polyester composition to 70° C. above the Tg temperature of the polyester composition;
wherein the stretch ratio of the sports bottle with respect to the preform is from 1.2× to 2.5×;
wherein the Tg of the polyester composition is from 105° C. to 125° C.;
wherein the sports bottle displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 25 mole % of isosorbide residues;
  ii) 45 to 55 mole % of 1,4-cyclohexanedimethanol residues; and
  iii) 20 to 40 mole % ethylene glycol residues,
wherein the total mole % of the dicarboxylic acid component is 100 mole %, and the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.5 g/100 ml at 25° C.

In one aspect of the processes of the invention, the process for making a sports bottle can comprise blow molding a preform made from a polyester composition,
wherein the preform temperature at the time of inflation is at least 30° C. above the Tg temperature of the polyester composition;
wherein the stretch ratio of the sports bottle (or other article of manufacture) with respect to the preform is from 1.4× to 2.0×;
wherein the Tg of the polyester composition is from 90° C. to 130° C.;
wherein the sports bottle displays shrinkage of 5% or less after immersion in boiling water for one hour;

wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 5 to 35 mole % of isosorbide residues;
  ii) 40 to 65 mole % of 1,4-cyclohexanedimethanol residues; and
  iii) 20 to 40 mole % ethylene glycol residues,
wherein the total mole % of the dicarboxylic acid component is 100 mole %, and the total mole % of the glycol component is 100 mole %;
wherein the inherent viscosity of the polyester is from 0.40 to 1.0 dL/g as determined in 60/40 (wt/wt) phenol/tetrachloroethane at a concentration of 0.5 g/100 ml at 25° C.

In one aspect of the processes of the invention, the process for making a sports bottle can comprise blow molding a preform made from a polyester composition,
wherein the preform temperature at the time of inflation is at least 30° C. above the Tg temperature of the polyester composition;
wherein the stretch ratio of the sports bottle with respect to the preform is from 1.2× to 2.0×;
wherein the Tg of the polyester composition is from 105° C. to 125° C.;
wherein the sports bottle displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 30 mole % of isosorbide residues;
  ii) 45 to 60 mole % of 1,4-cyclohexanedimethanol residues; and
  iii) 20 to 40 mole % ethylene glycol residues
wherein the total mole % of the dicarboxylic acid component is 100 mole %, and the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.5 g/100 ml at 25° C.

In one aspect of the processes of the invention, the process for making a sports bottle can comprise blow molding a preform made from a polyester composition,
wherein the preform temperature at the time of inflation is at least 30° C. above the Tg temperature of the polyester composition;
wherein the stretch ratio of the sports bottle (article of manufacture) with respect to the preform is from 1.2× to 2.0×;
wherein the Tg of the polyester composition is from 90° C. to 130° C.;
wherein the sports bottle (article of manufacture) displays shrinkage of 5% or less after immersion in boiling water for one hour;
wherein the polyester composition comprises:
(I) at least one polyester, which comprises
(a) a dicarboxylic acid component comprising:
  i) 70 to 100 mole % of terephthalic acid residues;
  ii) 0 to 30 mole % of aromatic dicarboxylic acid residues having up to 20 carbon atoms; and
  iii) 0 to 10 mole % of aliphatic dicarboxylic acid residues having up to 16 carbon atoms; and
(b) a glycol component comprising:
  i) 10 to 25 mole % of 2isosorbide residues;
  ii) 45 to 55 mole % of 1,4-cyclohexanedimethanol residues; and
  iii) 20 to 40 mole % ethylene glycol residues,
wherein the total mole % of the dicarboxylic acid component is 100 mole %, and the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.5 g/100 ml at 25° C.

In one aspect of the invention, articles of manufacture are provided wherein the processes of the invention result in a container.

In one aspect of the invention, articles of manufacture are provided wherein the processes of the invention result in a bottle.

In one aspect of the invention, articles of manufacture are provided wherein the processes of the invention result in a sports bottle.

In one aspect of the inventions, articles of manufacture are provided wherein the processes of the invention result in a baby bottle.

In one aspect of the invention, articles of manufacture are provided wherein the processes of the invention result in a foodstuff container.

The processes of this invention and/or the products resulting therefrom have advantages which include but are not limited to: favorable consumer perception because of the lack of BPA in the final product. good chemical resistance and good hydrolytic stability.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE INVENTION

The present disclosure may be understood more readily by reference to the following detailed description of certain embodiments of the invention and the working examples.

In accordance with the purposes of this invention, certain embodiments of the invention are described in the Summary of the Invention and are further described herein below. Also, other embodiments of the invention are described herein.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example, 1, 2, 3, 4, etc., as well as the endpoints 0 and 10. Also, a range associated with chemical substituent groups such as, for example, "$C_1$ to $C_5$ hydrocarbons," is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the appended claims, the singular forms "a," "an," and "the" include their plural referents unless the context clearly dictates otherwise. For example, reference to the processing or making of a "bottle" or a "polyester," is intended to include the processing or making of a plurality of bottles, or polyesters. References to a composition containing or including "an" alkyl radical or "a" blend is intended to include other ingredients or other components, respectively, in addition to the one named.

By "comprising" or "containing" or "including," this disclosure intends that at least the named compound, element, particle, or method step, etc., is present in the composition or article or method, but does not exclude the presence of other compounds, catalysts, materials, particles, method steps, etc., even if the other such compounds, materials, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and it is to be understood that the recited lettering can be arranged in any sequence, unless otherwise indicated.

For purposes of this application, Tg is defined as the glass transition temperature measured by differential scanning calorimetry (DSC) at a scan rate of 20° C./min. The sample being measured should have been heated above its melting point and quenched prior to the scan.

"Container" is any receptacle capable of holding foodstuffs and capable of resisting immersion in boiling water.

The term "bottle" as used herein is understood to mean a container capable of holding liquid. The bottles of the invention can be used, for example, for administering liquids to human beings who are fed by bottles, such as babies.

It is also envisioned that this invention could be applied to bottles, including but not limited to sports bottles or baby bottles, containers, or articles where resistance to immersion in boiling water is desired. Such applications include containers used to hold food during boiling-water pasteurization.

"Polymeric material" refers to any material produced by the polymerization of one or more monomers and capable of being molded.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically, the difunctional carboxylic acid can be a dicarboxylic acid and the difunctional hydroxyl compound can be a dihydric alcohol such as, for example, glycols and diols.

The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone.

The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof.

Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

Polyesters generally comprise at least one dicarboxylic acid and at least one glycol. Monomers other than isosorbides are used in conjunction with isosorbide in the preparation of the polyesters of the invention. These monomers include generally at least one glycol other than isosorbide and at least one dicarboxylic acid. Glycols useful in the present invention other than isosorbide include cycloaliphatic diols preferably having 6 to 20 carbon atoms or aliphatic diols preferably having 2 to 20 carbon atoms, more preferably having 2 to 12 carbon atoms. Examples of such diols include, but are not limited to, ethylene glycol, 1,3-propanediol, 1,4-butanediol; 1,5-pentanediol; 1,6-hexanediol; 3-methylpentanediol-(2,4-), 2-methylpentanediol-(1,4-), 2,2,4-trimethylpentanediol-(1,3-), 2-ethylhexanediol-(1,3-), 2,2-diethylpropanediol(1,3-), 1,3-hexanediol, 1,4-di-(hydroxyethoxy)-benzene, 2,2-bis-(4-hydroxycyclohexyl)-propane, 2,2-bis-(3-hydroxyethoxyphenyl)-propane diol, neopentyl glycol; diethylene glycol; 1,8-octanediol; 1,10-decanediol; cis or trans-1,4-cyclohexanedimethanol and mixtures of cis and trans monomers; 2,2,4,4-tetramethyl-1, 3-cyclobutanediol, triethylene glycol, 2,2-bis[4-(2-hydroxyethoxyl)phenyl]propane; 1,1-bis[4-(2-hydroxyethoxy)-phenyl]cyclohexane; 9,9-bis[4-(2-hydroxyethoxyl)phenyl] fluorene; 1,4:3,6-dianhydromannitol; 1,4:3,6-dianhydroiditol and 1,4-anhydroerythritol. Preferred diol moieties other than isosorbide are derived from ethylene glycol, 1,4-butanediol, 1,3-propanediol, neopentyl glycol, and 1,4-cyclohexanedimethanol. The most preferred glycols other than isosorbide are ethylene glycol and 1,4-cyclohexanedimethanol. Small amounts of alcohols with functionality greater than 2 may also be utilized, e.g., trimethylopropane and pentaerythritol. Any combination of these glycols with isosorbide may be used. It is preferred that the glycol component of the polyester of the invention comprise 50 to 99.75 mole % of one or more of these glycols (other than isosorbide). In the glycol component of the polyester useful in this invention, the mole percentages of the glycols referred to herein equal a total of 100 mole %.

Useful dicarboxylic acids of the invention include, but are not limited to, aromatic dicarboxylic acids preferably having from 6 to 40 carbon atoms, more preferably, 8 to 14 carbon atoms; aliphatic dicarboxylic acids having, preferably, 2 to 40 carbon atoms, more preferably 4 to 12 carbon atoms; or cycloaliphatic dicarboxylic acids having 5 to 40 carbon atoms, more preferably 8 to 12 carbon atoms. Examples of dicarboxylic acids useful in this invention include, but are not limited to, terephthalic acid, isophthalic acid, 1,4-naphthlenedicarboxylic acid, 2,6-naphthalenedicarboxylic acid, 2,7-naphthalenedicarboxylic acid, 1,4-cyclohexanedicarboxylic acid, cyclohexanediacetic acid, 5-sodiosulfoisophthalic acid, adipic acid, azelaic acid, glutaric acid, maleic acid, malonic acid, dimethylmalonic acid, allylmalonic acid, oxalic acid, sebacic acid, succinic acid, carbonic acid, sulfoisophthalic acid, 2,5-furandicarboxylic acid, 2,5-thiophenedicarboxylic acid, 3,4'- and 4,4'-diphenyl sulfide dicarboxylic acid, diphenyl-4,4'-dicarboxylic acid, naphthalenedicarboxylate, 3,4'- and 4,4'-diphenylsulfone dicarboxylic acid, 3,4'- and 4,4'-benzophenonedicarboxylic acid, 4,4'-methylene bis(cyclohexyl)dicarboxylic acid, trans-1,4-cyclohexanedicarboxylic acid, cis-1,4-cyclohexanedicarboxylic acid, cis- and/or trans-1,3-cyclohexanedicarboxylic acid, 4-cyclohexane-1,2-dicarboxylic acid, 2-ethylsuberic acid, 1,2-bis(4-carboxyphenoxy)ethane, 4,4'-methylene-bis (benzoic) acid, 4,4'-methylene-bis(cyclohexyl) carboxylic acid, 3,4-furandicarboxylic acid, 1,1-cyclobutane dicarboxylic acid, p-carboxyphenyl/oxybenzoic acid, ethylene(p-oxybenzoic acid), trans-4,4'-stilbenedicarboxylic acid, 2,2, 3,3-tetramethylsuccinic acid, cyclopentanedicarboxylic acid, decahydro-1,5-naphthylene dicarboxylic acid, decahydro-2,6-naphthylene dicarboxylic acid, 4,4-bicyclohexyl dicarboxylic acid, fumaric acid, dimer acid, resorcinoldiacetic acid, and 4,4'-bibenzoic acid and the like.

Of these, terephthalic acid, isophthalic acid, naphthalenedicarboxylic acid, and cyclohexanedicarboxylic acid are preferred. More preferred acids are terephthalic acid, isophthalic acid, and naphthalenedicarboxylic acid. Even more preferred acids are terephthalic acid and isophthalic acid, either used singly or in combination.

When cyclohexanedicarboxylic acid is used in the context of this invention, cis-, trans-, or cis/trans mixtures may be used. Any of the naphthalenedicarboxylic acid isomers or mixtures of isomers may be used. Some preferred naphthalenedicarboxylic acid isomers include 2, 6-, 2,7-, 1,4-, and 1,5-isomers.

Small amounts of trifunctional acids may also be employed, e.g., 1,3,5-benzenetricarboxylic acid. Further, by "aromatic" and "alicyclic", it is meant to include substituted aromatic or alicyclic compounds, e.g., aromatic compounds substituted with an aliphatic group.

Copolyesters may be prepared from one or more of the above dicarboxylic acids.

It should be understood that "dicarboxylic acids" includes the corresponding acid anhydrides, esters, and acid chlorides of these acids. In the acid component of the polyester useful in the invention, the mole percentages of the acids referred to herein equal a total of 100 mole %.

For commercial reasons, the following polyesters are preferred embodiments of the invention:

Polyesters comprising terephthalic acid and/or isophthalic acid and ethylene glycol and/or 1,4-cyclohexanedimethanol with isosorbide moieties are preferred.

The acid component of the copolyester of the invention may contain from about 10 to about 100 mole % of any of the dicarboxylic acids described herein. However the polyester of the invention preferably comprises one or more dicarboxylic acids comprising at least 50 mole %, preferably 60 mole to 100 mole %, more preferably 80 to 100 mole % and even more preferably from 90 to 100 mole % terephthalic acid. By terephthalic acid, suitable synthetic equivalents, such as dimethyl terephthlate, are included.

When isophthalic acid is present as the dicarboxylic acid, the isophthalic acid is preferably present in the amount of 0.1 to 50 mole %.

It is also preferable when the acid component of the copolyester comprises naphthalenedicarboxylic acid, it is present in the amount of 0.1 to 50 mole %. When terephthalic acid and naphthalenedicarboxylic acid are both present in the polyester, it is preferable that the naphthalenedicarboxylic acid is present in the amount of 0.1 to 50 mole % and that the terephthalic acid is present in the amount of 50 to 99.9 mole %.

The polyesters of the invention preferably comprise isosorbide moieties in amounts in the range of about 0.01 to about 50 mole %, preferably about 0.25 to about 30 mole %, and even more preferably, about 10 to about 30 mole %, and yet even more preferably, about 20 to about 30% mole. Depending on the application, isosorbide may be present in other desirable ranges such as 1 mole % to 3 mole %, 1 mole % to 6 mole %, 1 mole % to 8 mole % and 1 mole % to 20 mole %.

In one embodiment of this invention it is also preferred but not required that the diacid component of the polyester comprise 80 to 100 mole %, more preferably, 90-100 mole %, and even more preferably 95 to 100 mole percent of terephthalic acid. Isophthalic acid may also be included in the diacid component of this invention.

In this embodiment, isosorbide comprises from 0.01 to 50 mole %, 1 to 50 mole %, or 5 to 50 mole %; or 10 to 50 mole %; or 15 to 50 mole %, or 20 to 50 mole %, or 25 to 50 mole %, or 30 to 50 mole %, or 35 to 50 mole %, or 40 to 50 mole %, or 0.01 to 45 mole %, 1 to 45 mole %, or 5 to 45 mole %; or 10 to 45 mole %; or 15 to 45 mole %, or 20 to 45 mole %, or 25 to 45 mole %, or 30 to 45 mole %, or 35 to 45 mole %, or 0.01 to 40 mole %, or 1 to 40 mole %, or 5 to 40 mole %; or 10 to 40 mole %; or 15 to 40 mole %, or 20 to 40 mole %, or 25 to 40 mole %, or 30 to 40 mole %, 0.01 to 35 mole %, or 1 to 35 mole %, or 5 to 35 mole %; or 10 to 35 mole %; or 15 to 35 mole %, or 20 to 35 mole %, or 25 to 35 mole %, 0.01 to 30 mole %, or 1 to 30 mole %, or 5 to 30 mole %; or 10 to 30 mole %; or 15 to 30 mole %, or 20 to 30 mole %, 0.01 to 25 mole %, or 1 to 25 mole %, or 5 to 25 mole %; or 10 to 25 mole %; or 15 to 25 mole %, 0.01 to 20 mole %, or 1 to 20 mole %, or 5 to 20 mole %; or 10 to 20 mole %; 0.01 to 15 mole %, or 1 to 15 mole %, or 5 to 15 mole %; or 0.01 to 10 mole %, or 1 to 10 mole %, or 2 to 10 mole % of the glycol of this polyester.

In this embodiment, the glycol component of the polyesters useful in the invention comprises 1,4-cyclohexanedimethanol in at least one of the following ranges: 20 to 95 mole % mole percent, or 20 to 90 mole percent, or 20 to 85 mole percent, or 20 to 80 mole percent, or 20 to 75 mole percent, or 20 to 70 mole percent, or 20 to 65 mole percent, or 20 to 60 mole percent, or 20 to 55 mole percent, or 20 to 50 mole percent, 25 to 95 mole % mole percent, or 25 to 90 mole percent, or 25 to 85 mole percent, or 25 to 80 mole percent, or 25 to 75 mole percent, or 25 to 70 mole percent, or 25 to 65 mole percent, or 25 to 60 mole percent, or 25 to 55 mole percent, or 25 to 50 mole percent, or 30 to 95 mole % mole percent, or 30 to 90 mole percent, or 30 to 85 mole percent, or 30 to 80 mole percent, or 30 to 75 mole percent, or 30 to 70 mole percent, or 30 to 65 mole percent, or 30 to 60 mole percent, or 30 to 55 mole percent, or 30 to 50 mole percent, or 35 to 95 mole % mole percent, or 35 to 90 mole percent, or 35 to 85 mole percent, or 35 to 80 mole percent, or 35 to 75 mole percent, or 35 to 70 mole percent, or 35 to 65 mole percent, or 35 to 60 mole percent, or 35 to 55 mole percent, or 35 to 50 mole percent, or 40 to 95 mole percent, or 40 to 90 mole percent %, or 40 to 85 mole percent, or 40 to 80 mole percent, or 40 to 75 mole percent, or 40 to 70 mole percent, or 40 to 65 mole percent, or 40 to 60 mole percent, or 40 to 55 mole percent, or 40 to 50 mole percent, or 45 to 95 mole percent, or 45 to 90 mole %, or 45 to 85 mole percent, or 45 to 80 mole percent, or 45 to 75 mole percent, or 45 to 70 mole percent, or 45 to 65 mole percent, or 45 to 60 mole percent, or 45 to 55 mole percent, or 50 to 95 mole percent, or 50 to 90 mole %, or 50 to 85 mole percent, or 50 to 80 mole percent, or 50 to 75 mole percent, or 50 to 70 mole percent, or 50 to 65 mole percent, or 50 to 60 mole percent, or 55 to 95 mole %, or, 60 to 90 mole percent 1,4-cyclohexanedimethanol, or 60 to 70 mole % 1,4-cyclohexanedimethanol. In this embodiment, it is preferred but not required that the remainder of the glycol component is ethylene glycol. In this embodiment, is also preferred but not required that the diacid component of the polyester comprise 80 to 100 mole %, more preferably, 90 to 100 mole %, and even more preferably 95 to 100 mole percent of terephthalic acid. A preferred additional diacid is isophthalic acid.

For certain embodiments of the invention, the polymers useful in the invention may exhibit at least one of the following inherent viscosities as determined in 60/40 (wt/wt) phenol/tetrachloroethane at a concentration of 0.5 g/100 ml at 25° C.: 0.10 to 1.2 dL/g; 0.10 to 1.1 dL/g; 0.10 to 1 dL/g; 0.10 to less than 1 dL/g; 0.10 to 0.98 dL/g; 0.10 to 0.95 dL/g; 0.10 to 0.90 dL/g; 0.10 to 0.85 dL/g; 0.10 to 0.80 dL/g; 0.10 to 0.75 dL/g; 0.10 to less than 0.75 dL/g; 0.10 to 0.72 dL/g; 0.10 to 0.70 dL/g; 0.10 to less than 0.70 dL/g; 0.10 to 0.68 dL/g; 0.10 to less than 0.68 dL/g; 0.10 to 0.65 dL/g; 0.20 to 1.2 dL/g; 0.20 to 1.1 dL/g; 0.20 to 1 dL/g; 0.20 to less than 1 dL/g; 0.20 to 0.98 dL/g; 0.20 to 0.95 dL/g; 0.20 to 0.90 dL/g; 0.20 to 0.85 dL/g; 0.20 to 0.80 dL/g; 0.20 to 0.75 dL/g; 0.20 to less than 0.75 dL/g; 0.20 to 0.72 dL/g; 0.20 to 0.70 dL/g; 0.20 to less than 0.70 dL/g; 0.20 to 0.68 dL/g; 0.20 to less than 0.68 dL/g; 0.20 to 0.65 dL/g; 0.35 to 1.2 dL/g; 0.35 to 1.1 dL/g; 0.35 to 1 dL/g; 0.35 to less than 1 dL/g; 0.35 to 0.98 dL/g; 0.35 to 0.95 dL/g; 0.35 to 0.90 dL/g; 0.35 to 0.85 dL/g; 0.35 to 0.80 dL/g; 0.35 to 0.75 dL/g; 0.35 to less than 0.75 dL/g; 0.35 to 0.72 dL/g; 0.35 to 0.70 dL/g; 0.35 to less than 0.70 dL/g; 0.35 to 0.68 dL/g; 0.35 to less than 0.68 dL/g; 0.35 to 0.65 dL/g; 0.40 to 1.2 dL/g; 0.40 to 1.1 dL/g; 0.40 to 1 dL/g; 0.40 to less than 1 dL/g; 0.40 to 0.98 dL/g; 0.40 to 0.95 dL/g; 0.40 to 0.90 dL/g; 0.40 to 0.85 dL/g; 0.40 to 0.80 dL/g; 0.40 to 0.75 dL/g; 0.40 to less than 0.75 dL/g; 0.40 to 0.72 dL/g; 0.40 to 0.70 dL/g; 0.40 to less than 0.70 dL/g; 0.40 to 0.68 dL/g; 0.40 to less than 0.68 dL/g; 0.40 to 0.65 dL/g; greater than 0.42 to 1.2 dL/g; greater than 0.42 to 1.1 dL/g; greater than 0.42 to 1 dL/g; greater than 0.42 to less than 1 dL/g; greater than 0.42 to 0.98 dL/g; greater than 0.42 to 0.95 dL/g; greater than 0.42 to 0.90 dL/g; greater than 0.42 to 0.85 dL/g; greater than 0.42 to 0.80 dL/g; greater than 0.42 to 0.75 dL/g; greater than 0.42 to less than 0.75 dL/g; greater than 0.42 to 0.72 dL/g; greater than 0.42 to less than 0.70 dL/g; greater than 0.42 to 0.68 dL/g; greater than 0.42 to less than 0.68 dL/g; and greater than 0.42 to 0.65 dL/g.

For certain embodiments of the invention, the polymers useful in the invention may exhibit at least one of the following inherent viscosities as determined in 60/40 (wt/wt) phenol/tetrachloroethane at a concentration of 0.5 g/100 ml at 25° C.: 0.45 to 1.2 dL/g; 0.45 to 1.1 dL/g; 0.45 to 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 1.2 dL/g; 0.68 to 1.1 dL/g; 0.68 to 1 dL/g; 0.68 to less than 1 dL/g; 0.68 to 0.98 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g; greater than 0.76 dL/g to 1.2 dL/g; greater than 0.76 dL/g to 1.1 dL/g; greater than 0.76 dL/g to 1 dL/g; greater than 0.76 dL/g to less than 1 dL/g; greater than 0.76 dL/g to 0.98 dL/g; greater than 0.76 dL/g to 0.95 dL/g; greater than 0.76 dL/g to 0.90 dL/g; greater than 0.80 dL/g to 1.2 dL/g; greater than 0.80 dL/g to 1.1 dL/g; greater than 0.80 dL/g to 1 dL/g; greater than 0.80 dL/g to less than 1 dL/g; greater than 0.80 dL/g to 1.2 dL/g; greater than 0.80 dL/g to 0.98 dL/g; greater than 0.80 dL/g to 0.95 dL/g; greater than 0.80 dL/g to 0.90 dL/g.

It is contemplated that the polymer compositions useful in the invention can possess at least one of isosorbide ranges for the compositions described herein combined with at least one of the 1,4-cyclohexanedimethanol ranges for the compositions described herein with at least one of the ethylene glycol ranges descried herein.

Methods for the isosorbide polymer preparation are described, for example, in U.S. Pat. Nos. 2,465,319 and 3,047,539. However, the polyesters of the invention can be made by any of several methods known in the art.

The polymers can also be made by a melt polymerization process which is known in the art, including that in which the acid component is either terephthalic acid or dimethyl terephthlate, and also may include the free acid or dimethyl ester of any other diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill in part from the reactor as the polymerization proceeds.

The polymerization reaction may be carried out in the presence of one or more conventional polymerization catalysts. Typical catalysts or catalyst systems for polyester condensation are well known in the art. Suitable catalysts are disclosed, for example, in U.S. Pat. Nos. 4,025,492, 4,136,089, 4,176,224, 4,238,593, and 4,208,527, the disclosures of which are herein incorporated by reference. Further, R. E. Wilfong, Journal of Polymer Science, 54, 385, (1961) describes typical catalysts, which are useful in polyester condensation reactions. Preferred catalyst systems include Ti, Ti/P, Mn/Ti/Co/P, Mn/Ti/P, Zn/Ti/Co/P, Zn/Ti/Co/P/Ge, Zn/Ti/P/Ge, Zn/Al, and Li/Al. When cobalt is not used in the polycondensation, copolymerizable toners may be incorporated into the copolyesters to control the color of these copolyesters so that they are suitable for the intended applications where color may be an important property. In addition to the catalysts and toners, other conventional additives, such as antioxidants, dyes, etc., may be used in the copolyesterifications in typical amounts.

Examples of such additives include pigments, colorants, stabilizers, antioxidants, extrusion aids, slip agents, carbon black, flame retardants and mixtures thereof.

One or more branching agents may also be useful in making the polyesters formed within the context of the invention. The branching agent can be one which provides branching in the acid unit portion of the polyester, or in the glycol unit portion, or it can be a hybrid. Some of these branching agents have already been described herein. However, illustrative of such branching agents are polyfunctional acids, polyfunctional glycols and acid/glycol hybrids. Examples include tri or tetracarboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like are useful within the context of this invention.

The invention is generally directed to sports bottles and other articles produced by blow molding from polymeric materials having glass transition temperatures ranging from 90° C. to 130° C., as well as to processes for producing them. These articles can be exposed to boiling water and can be produced by using a suitable combination of a stretch ratio of less than 3× and a preform temperature at least 20° C. greater than the glass transition temperature (Tg) of the polymeric material. Processes useful in the methods of the invention include stretch blow molding, injection blow molding, extrusion blow molding, and any process in which an initial preform or parison is blown into a final article.

The stretch ratio (S.R.) is defined by the following equation, where $D_B$ is the outer diameter of the bottle, $D_p$ is the outer diameter of the preform, $L_B$ is the overall length of the bottle minus 20 mm for the finish, and $L_p$ is the overall length of the perform minus 20 mm for the finish.

$$S.R. = \frac{D_B}{D_P} * \frac{L_B}{L_P} \quad (1)$$

One typical method to measure orientation, or lack thereof, is through optical measurements of refractive index, which can be used to calculate birefringence. Birefringence ($\Delta n$) is defined by the following equation, where TE is the index of refraction measured in the axial dimension, TEP is the index of refraction measured in the hoop dimension and TM is the index of refraction measured in the thickness dimension.

$$\Delta n = \left(\frac{(TE + TEP)}{2}\right) - TM \quad (2)$$

Birefringence measurements herein refer to measurements taken in the bottle sidewall, not immediately adjacent to the base or finish. In one embodiment, the articles produced according to this invention have birefringence values equal to or less than a value determined by the equation (103−Tg)/735, where Tg is the glass transition temperature of the polymer measured in degrees C. For a polymer with a Tg of 125 C, birefringence values must therefore be less than 0.030. For a polymer with a Tg of 120 C, birefringence values must therefore be less than 0.023. For a polymer with a Tg of 115 C, birefringence values must therefore be less than 0.016. For a polymer with a Tg of 110 C, birefringence values must therefore be less than 0.010.

One advantage provided by the present invention is the ability to make sports bottles and other articles capable of being exposed to boiling water with polymeric materials, such as polyesters, having glass transition temperatures ranging from 100° C. to 130° C., and having a certain combination of two or more of high impact strength, toughness, good color, clarity, low haze values, chemical resistance, and hydrolytic stability. For example, articles produced using conventional stretch ratios of 3× or higher and low preform temperatures result in articles with limited chemical resistance, which upon normal handling conditions and immersion in boiling water develop haze, shrinkage, and/or distortion. In one example of the bottles made by conventional methods, fingerprints on the bottle become permanently etched on the surface of the bottle after boiling the bottle in water, resulting in unacceptable haze. The chemical in this situation is simply the oil omnipresent on human skin. In contrast, the articles made by the methods of the invention display suitable haze values for applications that require clarity, such as sports bottle applications.

The development of fingerprint haze due to boiling water exposure can be quantified by measuring the relative light intensity of a laser light beam transmitted through a fingerprinted bottle both before and after exposure to boiling water. The ratio of laser light intensity before exposure divided by the laser light intensity after exposure is herefore defined as the transmission ratio. Transmission ratio values less than 0.80 corresponded to a noticeable observation of haze.

Also, bottles and articles made by conventional methods using polymeric materials with a Tg from 100 to 130° C. show shrinkage or distortion after being immersed in boiling water. Articles made according to the invention show shrinkage of 5% or less after being immersed in boiling water for one hour. In another embodiment, articles made according to the invention show shrinkage of 4% or less after being immersed in boiling water for one hour. In another embodiment, articles made according to the invention show shrinkage of 3% or less after being immersed in boiling water for one hour. In another embodiment, articles made according to the invention show shrinkage of 2% or less after being immersed in boiling water for one hour. In another embodiment, articles made according to the invention show shrinkage of 1% or less after being immersed in boiling water for one hour.

The articles of the invention are produced by using a suitable combination of a stretch ratio of less than 3× and a preform temperature at least 20° C. greater than the Tg of the polymeric material. In general, as the stretch ratio increases, so does the temperature of the preform used to produce an article of the invention. This relation can be described by the following equation: % Shrink=$(15.9+1.42\ SR-0.105\ Tg-0.0312\ Temp)^3$, where SR is the stretch ratio, Tg is the glass transition of the polymer in degrees C., and Temp is the temperature of the preform in degrees C. Thus, if the Tg of the polymer was 115 C and the stretch ratio was 1.4×, then the temperature of the preform would have to be 132 C or greater to obtain shrinkage values of 5% or less. Alternatively, if the Tg of the polymer was 115 C and the stretch ratio was 2.0×, then the temperature of the preform would have to be 159 C or greater to obtain shrinkage values of 5% or less after 1 hour of boiling. The maximum allowable shrinkage (% shrink) is 5%, preferably 4%, more preferably 3%, most preferably 2%. Typical PET bottles are blown with an air pressure of 100 psi. In general, reducing the blow pressure reduces the degree of orientation in the bottle. In one embodiment of the invention, the blow pressure is reduced during the blowing of the article of the invention. In another embodiment, the bottles of the invention are produced at air pressures of 75 psi or below, preferably 50 psi or below, more preferably 25 psi or below.

In one embodiment, articles of the invention are produced with a stretch ratio of less than or equal to 3×. In other embodiments, the stretch ratio is less than or equal to 2.7×, less than or equal to 2.5×, or less than or equal to 2.0×. In yet another embodiment, the stretch ratio ranges from 1.2× to 2.0×. In another embodiment, the stretch ratio ranges from 1.3× to 1.7×. In one embodiment, the preform temperature at the time of inflation is Tg+20° C. or higher. In another embodiment, the preform temperature at the time of inflation is Tg+30° C. or higher. In another embodiment, the stretch ratio is less than 2× and the preform temperature is Tg+30° C. or higher. The preform temperature at the time of inflation refers to the temperature of the preform at the moment it is placed into the blow mold (~1 second prior to inflation). In certain embodiments of the invention, the preform temperature at the time of inflation can be at least one of the following temperatures: higher than Tg+20° C., higher than Tg+25° C., higher than Tg+30° C., higher than Tg+35° C., higher than Tg+40° C., higher than Tg+45° C., higher than Tg+50° C., higher than Tg+55° C., higher than Tg+60° C., higher than Tg+65° C., higher than Tg+70° C., from Tg+20° C. to Tg+70° C., from Tg+20° C. to Tg+65° C., from Tg+20° C. to Tg+60° C., from Tg+20° C. to Tg+55° C., from Tg+20° C. to Tg+50° C., from Tg+20° C. to Tg+45° C., from Tg+20° C. to Tg+40° C., from Tg+20° C. to Tg+35° C., from Tg+20° C. to Tg+30° C., from Tg+20° C. to Tg+25° C., from Tg+25° C. to Tg+70° C., from Tg+25° C. to Tg+65° C., from Tg+25° C. to Tg+55° C., from Tg+25° C. to Tg+50° C., from Tg+25° C. to Tg+45° C., from Tg+25° C. to Tg+40° C., from Tg+25° C. to Tg+35° C., from Tg+25° C. to Tg+30° C., from Tg+30° C. to Tg+70° C., from Tg+30° C. to Tg+65° C., from Tg+30° C. to Tg+60° C., from Tg+30° C. to Tg+55° C., from Tg+30° C. to Tg+50° C., from Tg+30° C. to Tg+45° C., from Tg+30° C. to Tg+40° C., from Tg+30° C. to Tg+35° C., from Tg+35° C. to Tg+70° C., from Tg+35° C. to Tg+65° C., from Tg+35° C. to Tg+60° C., from Tg+35° C. to Tg+55° C., from Tg+35° C. to Tg+50° C., from Tg+35° C. to Tg+45° C., from Tg+35° C. to Tg+40° C., from Tg+40° C. to Tg+70° C., from Tg+40° C. to Tg+65° C., from Tg+40° C. to Tg+60° C., from Tg+40° C. to Tg+55° C., from Tg+40° C. to Tg+50° C., from Tg+40° C. to Tg+45° C., from Tg+45° C. to Tg+70° C., from Tg+45° C. to Tg+65° C., from Tg+45° C. to Tg+60° C., from Tg+45° C. to Tg+55° C., from Tg+45° C. to Tg+50° C., from Tg+50° C. to Tg+70° C., from Tg+50° C. to Tg+65° C., from Tg+50° C. to Tg+60° C., from Tg+50° C. to Tg+55° C., from Tg+55° C. to Tg+70° C., from Tg+55° C. to Tg+65° C., from Tg+55° C. to Tg+60° C., from Tg+60° C. to Tg+65° C., and from Tg+65° C. to Tg+70° C. In certain embodiments of the invention, the stretch ratio of the final article relative to the preform can be at least one of the following ratios: 1.2× to less than 3×, 1.2× to 3×, 1.2× to 2.7×, 1.2× to 2.5×, 1.2× to 2.0×, 1.2× to 1.9×, 1.2× to 1.8×, 1.2× to 1.7×, 1.2× to 1.6×, 1.2× to 1.5×, 1.2× to 1.4×, 1.2× to 1.3×, 1.3× to less than 3×, 1.3× to 3×, 1.3× to 2.7×, 1.3× to 2.5×, 1.3× to 2.0×, 1.3× to 1.9×, 1.3× to 1.8×, 1.3× to 1.7×, 1.3× to 1.6×, 1.3× to 1.5×, 1.3× to 1.4×, 1.4× to less than 3×, 1.4× to 3×, 1.4× to 2.7×, 1.4× to 2.5×, 1.4× to 2.0×, 1.4× to 1.9×, 1.4× to 1.8×, 1.4× to 1.7×, 1.4× to 1.6×, 1.4× to 1.5×, 1.5× to less than 3×, 1.5× to 3×, 1.5× to 2.7×, 1.5× to 2.5×, 1.5× to 2.0×, 1.5× to 1.9×, 1.5× to 1.8×, 1.5× to 1.7×, 1.5× to 1.6×, 1.6× to less than 3×, 1.6× to 3×, 1.6× to 2.7×, 1.6× to 2.5×, 1.6× to 2.0×, 1.6× to 1.9×, 1.6× to 1.8×, 1.6× to 1.7×, 1.7× to less than 3×, 1.7× to 3×, 1.7× to 2.7×, 1.7× to 2.5×, 1.7× to 2.0×, 1.7× to 1.9×, 1.7× to 1.8×, 1.8× to less than 3×, 1.8× to 3×, 1.8× to 2.7×, 1.8× to 2.5×, 1.8× to 2.0×, 1.8× to 1.9×, 1.9× to less than 3×, 1.9× to 3×, 1.9× to 2.7×, 1.9× to 2.5×, 1.9× to 2.0×, 2.0× to less than 3×, 2.0× to 3×, 2.0× to 2.7×, 2.0× to 2.5×, 2.7× to less than 3×, 2.7× to 3×, 2.5× to 2.7×, 2.5× to less than 3×, 2.5× to 3×, less than 3×, less than 2.9×, less than 2.8×, less than 2.7×, less than 2.6×, less than 2.5×, less than 2.4×, less than 2.3×, less than 2.2×, less than 2.1×, less than 2.0×, less than 1.9×, less than 1.8×, less than 1.7×, less than 1.6×, and less than 1.5×.

The preferred preform for this invention would have a length of 90% to 100% of the final bottle length to provide an axial stretch ratio of 1.0× to 1.1×, and a diameter of 60% to 100% of the final bottle diameter to provide a radial stretch ratio of 1.0× to 1.7×. It is recognized that design considerations may require that the finish diameter be smaller than the bottle diameter, which may result in a practical diameter for the preform being 60% to 80% of the final bottle diameter to provide a radial stretch ratio of 1.3× to 1.7×. It is also recognized that the preform may require some degree of taper to assist in removal from the mold. In this case, the taper should be kept to a minimum in order to minimize the radial stretch ratio at the bottom of the preform.

It is contemplated that the processes of the invention can be carried out at a suitable combination of any of the stretch ration described herein, any of the preform temperatures described herein, and any of the blow pressures described herein, unless otherwise stated. It is also contemplated that an article made by a process of the invention can possess a suitable combination of any of the haze values described herein, any of the birefringence values described herein, and any of the shrinkage values described herein, unless otherwise stated.

In another embodiment, the wall thickness of the bottle is increased. For example, in one embodiment, the thickness of the bottles is greater than 0.5 mm, preferably greater than 0.75 mm, more preferably greater than 1 mm. In one embodiment, the articles made according to the invention and/or the polymeric material compositions useful in the invention, with or without toners, can have color values L*, a* and b*, which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In certain embodiments, the b* values for the polyesters useful in the invention can be from −10 to less than 10 and the L* values can be from 50 to 90. In other embodiments, the b* values for the polyesters useful in the invention can be present in one of the following ranges: −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 tog; 1 to 8; 1 to 7; 1 to 6; 1 to 5; 1 to 4; 1 to 3; and 1 to 2. In other embodiments, the L* value for the polyesters useful in the invention can be present in one of the following ranges: 50 to 60; 50 to 70; 50 to 80; 50 to 90; 60 to 70; 60 to 80; 60 to 90; 70 to 80; 79 to 90.

Articles made according to the invention can be immersed in boiling water without showing detrimental shrinkage or distortion or cycled through a dishwasher where temperature resistance and chemical resistance is desired. Therefore, the invention is suitable for producing blow molded sports bottles where those characteristics are desired. In one embodiment, sports bottles have at least one additional property chosen from toughness, clarity, chemical resistance, Tg, hydrolytic stability and dishwasher stability.

It is contemplated that compositions useful in the sports bottles of the invention can possess at least one of the inherent viscosity ranges described herein and at least one of the monomer ranges for the compositions described herein unless otherwise stated. It is also contemplated that compositions useful in the sports bottles of the invention can possess at least one of the Tg ranges described herein and at least one of the monomer ranges for the compositions described herein unless otherwise stated. It is also contemplated that compositions useful in the sports bottles of the invention can possess at least one of the inherent viscosity ranges described herein, at least one of the Tg ranges described herein, and at least one of the monomer ranges for the compositions described herein unless otherwise stated.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in sports bottles of the invention. In certain embodiments, terephthalic acid residues can make up a portion or all of the dicarboxylic acid component used to form the polyesters useful in the sports bottles of the invention at a concentration of at least 70 mole %, such as at least 80 mole %, at least 90 mole % at least 95 mole %, at least 99 mole %, or even 100 mole %. In certain embodiments, higher amounts of terephthalic acid can be used in order to produce a higher impact strength polyester useful in the sports bottles of the invention. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyester useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, 0.01 to 20 mole %, from 0.01 to 10 mole %, from 0.01 to 5 mole % and from 0.01 to 1 mole. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid. In another embodiment, the modifying aromatic dicarboxylic acid is naphthalenedicarboxylic acid. In yet another embodiment, the modifying aromatic dicarboxylic acid is trans-4,4'-stilbenedicarboxylic acid.

The carboxylic acid component of the polyesters useful in the sports bottles of the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

The 1,4-cyclohexanedimethanol may be cis, trans, or a mixture thereof, for example, a cis/trans ratio of 60:40 to 40:60. In another embodiment, the trans-1,4-cyclohexanedimethanol can be present in an amount of 60 to 80 mole %. In another embodiment, the trans-1,4-cyclohexanedimethanol can be present in an amount of 70 mole % and cis-1,4-cyclohexanedimethanol can be present in an amount of 30 mole %.

The glycol component of the polyester portion of the polyester composition useful in the sports bottles of the invention can contain 25 mole % or less of one or more modifying glycols which are not 2,2,4,4-tetramethyl-1,3-cyclobutanediol or 1,4-cyclohexanedimethanol; in one embodiment, the polyesters useful in the sports bottles of the invention may contain less than 15 mole % or of one or more modifying glycols. In another embodiment, the polyesters useful in the sports bottles of the invention can contain 10 mole or less of one or more modifying glycols. In another embodiment, the polyesters useful in the sports bottles of the invention can contain 5 mole % or less of one or more modifying glycols. In another embodiment, the polyesters useful in the sports bottles of the invention can contain 3 mole % or less of one or more modifying glycols. In another embodiment, the polyesters useful in the sports bottles of the invention can contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the sports bottles of the invention refer to diols other than 2,2,4,4-tetramethyl-1,3-cyclobutanediol and 1,4-cyclohexanedimethanol and can contain 2 to 16 carbon atoms. Examples of suitable modifying glycols include, but are not limited to, ethylene glycol, 1,2-propanediol, 1,3-propanediol, neopentyl glycol, 1,4-butanediol, 1,5-pentanediol, 1,6-hexanediol, p-xylene glycol, or mixtures thereof. In one embodiment, the modifying glycol is ethylene glycol. In another embodiment, the modifying glycols include, but are not limited to, 1,3-propanediol and 1,4-butanediol. In another embodiment, ethylene glycol is excluded as a modifying diol. In another embodiment, 1,3-propanediol and 1,4-butanediol are excluded as modifying diols. In another embodiment, 2,2-dimethyl-1,3-propanediol is excluded as a modifying diol.

The polyesters and/or certain polyester/polycarbonate blends useful in the polyesters compositions useful in the sports bottles of the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the sports bottles of the invention can thus be linear or branched. The polycarbonate can also be linear or branched. In certain embodiments, the branching monomer or agent may be added prior to and/or during and/or after the polymerization of the polycarbonate.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference In one aspect, the polyester compositions useful in the sports bottles of the invention contain polycarbonate.

In one aspect, the polyester compositions useful in the sports bottles of the invention contain no polycarbonate.

In one aspect, the polyester compositions useful in the sports bottles of the invention contain substantially no polycarbonate.

In one aspect, the polyesters useful in the sports bottles of the invention contain no ethylene glycol residues.

In one aspect, the polyesters useful in the sports bottles of the invention contain substantially no ethylene glycol residues.

In one aspect the polyester compositions useful in the sports bottles of the invention contain at least one thermal stabilizer and/or reaction products thereof.

In addition, the polymeric materials and blends useful in the sports bottles of this invention may also contain from 0.01 to 25% by weight of the overall composition common additives such as colorants, dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

The polyesters useful in the sports bottles of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally from 0.1 percent by weight to 10 percent by weight, such as 0.1 to 5 percent by weight, based on the total weight of the polyester.

I claim:

1. A process for making a sports bottle comprising blow molding a preform made from a polymeric material,
   wherein the preform temperature at the time of inflation is at least 20° C. above the Tg temperature of the polymeric material;
   wherein the stretch ratio of the sports bottle with respect to the preform is 2.7× or less;
   wherein the Tg of the polymeric material is from 90° C. to 130° C.;
   wherein the polymeric material is a polyester composition comprising:
   (I) at least one polyester, which comprises
      (a) a dicarboxylic acid component comprising:
         i) 70 to 100 mole % of terephthalic acid residues;
         ii) 0 to 30 mole % of aromatic dicarboxylic acid residues having up to 20 carbon atoms; and
         iii) 0 to 10 mole % of aliphatic dicarboxylic acid residues having up to 16 carbon atoms; and
      (b) a glycol component comprising:
         i) 5 to 35 mole % of isosorbide residues;
         ii) 40 to 65 mole % of 1,4-cyclohexanedimethanol residues, and
         iii) 20 to 45 mole % of ethylene glycol residues;
      wherein the total mole % of the dicarboxylic acid component is 100 mole %, and the total mole % of the glycol component is 100 mole %;
   wherein the inherent viscosity of the polyester is from 0.45 to 1.0 dL/g as determined in 60/40 (wt/wt) phenol/tetrachloroethane at a concentration of 0.5 g/100 ml at 25° C.; and
   wherein the sports bottle displays shrinkage of 5% or less after immersion in boiling water for one hour.

2. A process according to claim 1,
   wherein the glycol component of the polyester composition comprises 10 to 30 mole % of isosorbide residues; 45 to 60 mole % of 1,4-cyclohexanedimethanol residues, and 20 to 40 mole % of ethylene glycol residues;
   wherein the inherent viscosity of the polyester is from 0.50 to 0.80 dL/g as determined in 60/40 (wt/wt) phenol/tetrachloroethane at a concentration of 0.5 g/100 ml at 25° C.; and
   wherein the polyester has a Tg of from 90 to 130° C.

3. A process according to claim 1,
   wherein the glycol component of the polyester composition comprises 10 to 25 mole % of isosorbide residues; 45 to 55 mole % of 1,4-cyclohexanedimethanol residues; and 20 to 40 mole % ethylene glycol residues;
   wherein the inherent viscosity of the polyester is from 0.50 to 0.75 dL/g as determined in 60/40 (wt/wt) phenol/tetrachloroethane at a concentration of 0.5 g/100 ml at 25° C.; and
   wherein the polyester has a Tg of from 95 to 115°;
   wherein the inherent viscosity of the polyester is from 0.50 to 0.80 dL/g as determined in 60/40 (wt/wt) phenol/tetrachloroethane at a concentration of 0.5 g/100 ml at 25° C.; and
   wherein the polyester has a Tg of from 118 to 122° C.

4. A process according to claim 1, wherein the preform temperature at the time of inflation is at least 30° C. above the Tg temperature of the polymeric material.

5. A process according to claim 1, wherein the preform temperature at the time of inflation is from 30° C. above the Tg temperature of the polymeric material to 70° C. above the Tg temperature of the polymeric material.

6. A process according to claim 1, wherein the stretch ratio of the bottle with respect to the preform is from 1.2× to 2.7×.

7. A process according to claim 1, wherein the stretch ratio of the bottle with respect to the preform is from 1.2× to 2.5×.

8. A process according to claim 1, wherein the stretch ratio of the bottle with respect to the preform is from 1.2× to 2.0×.

9. A process according to claim 1, wherein the stretch ratio of the bottle with respect to the preform is from 1.3× to 1.7×.

10. A process according to claim 1, wherein the Tg of the polymeric material is from 95° C. to 130° C.

11. A process according to claim 1, wherein the Tg of the polymeric material is from 95° C. to 125° C.

12. A process according to claim 1, wherein the Tg of the polymeric material is from 100° C. to 130° C.

13. A process according to claim 1, wherein the sports bottle has a shrinkage of 4% or less after immersion in boiling water for one hour.

14. A process according to claim 1, wherein the sports bottle has a shrinkage of 3% or less after immersion in boiling water for one hour.

15. A process according to claim 1, wherein the sports bottle has a shrinkage of 2% or less after immersion in boiling water for one hour.

16. A process according to claim 1, wherein the sports bottle has a shrinkage of 1% or less after immersion in boiling water for one hour.

17. A process according to claim 1, wherein the sports bottle has a haze of 3% or less after immersion in boiling water for one hour.

18. A process according to claim 1, wherein a side wall of the sports bottle has a haze of 2% or less after immersion in boiling water for one hour.

19. A process according to claim 1, wherein a side wall of the sports bottle has a haze of 1% or less after immersion in boiling water for one hour.

20. A process according to claim 1, wherein a side wall of the sports bottle has a haze of 1% or less after immersion in boiling water for one hour.

21. A process according to claim 1, wherein a side wall of the sports bottle has a haze of 1% or less after immersion in boiling water for one hour.

22. A process according to claim 1, wherein a side wall of the sports bottle has a birefringence of 0.02 or less.

23. A process according to claim 1, wherein a side wall of the sports bottle has a birefringence of 0.015 or less.

24. A process according to claim 1, wherein a side wall of the sports bottle has a birefringence of 0.01 or less.

25. A process for making a sports bottle comprising blow molding a preform made from a polyester composition,
   wherein the preform temperature at the time of inflation is at least 20° C. above the Tg temperature of the polyester composition;
   wherein the stretch ratio of the sports bottle with respect to the preform is from 1.2× to 2.5×;
   wherein the Tg of the polyester composition is from 95° C. to 125° C.;
   wherein the sports bottle displays shrinkage of 5% or less after immersion in boiling water for one hour;
   wherein the polyester composition comprises:
   (I) at least one polyester, which comprises
      (a) a dicarboxylic acid component comprising:
         i) 70 to 100 mole % of terephthalic acid residues;
         ii) 0 to 30 mole % of aromatic dicarboxylic acid residues having up to 20 carbon atoms; and
         iii) 0 to 10 mole % of aliphatic dicarboxylic acid residues having up to 16 carbon atoms; and (b) a glycol component comprising:
  i) 10 to 30 mole % of isosorbide residues;
  ii) 40 to 65 mole % of 1,4-cyclohexanedimethanol residues, and
  iii) 20 to 40 mole % of ethylene glycol residues,
wherein the total mole % of the dicarboxylic acid component is 100 mole %, and the total mole % of the glycol component is 100 mole %;
wherein the inherent viscosity of the polyester is from 0.50 to 0.80 dL/g as determined in 60/40 (wt/wt) phenol/tetrachloroethane at a concentration of 0.5 g/100 ml at 25° C.

* * * * *

UNITED STATES PATENT AND TRADEMARK OFFICE
CERTIFICATE OF CORRECTION

PATENT NO. : 9,517,584 B2  
APPLICATION NO. : 14/132361  
DATED : December 13, 2016  
INVENTOR(S) : McCrary et al.

Page 1 of 1

It is certified that error appears in the above-identified patent and that said Letters Patent is hereby corrected as shown below:

On the Title Page

Item (72) Inventor is corrected to read:  
Robert Ellis McCrary, Kingsport, TN (US)  
Kaan Gunes, Kingsport, TN (US)

Signed and Sealed this  
Fourth Day of April, 2017

Michelle K. Lee  
*Director of the United States Patent and Trademark Office*